(12) United States Patent
Inoue et al.

(10) Patent No.: US 11,709,062 B2
(45) Date of Patent: Jul. 25, 2023

(54) BOARDING/DEBOARDING POINT PROVIDING SYSTEM, DATA SERVER, AND BOARDING/DEBOARDING POINT PROVIDING METHOD

(71) Applicant: Nissan Motor Co., Ltd., Yokohama (JP)

(72) Inventors: Hirofumi Inoue, Kanagawa (JP); Jo Nishiyama, Kanagawa (JP); Takehito Teraguchi, Kanagawa (JP); Yu Shikoda, Kanagawa (JP); Shota Okubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 209 days.

(21) Appl. No.: 17/285,522

(22) PCT Filed: Oct. 16, 2018

(86) PCT No.: PCT/JP2018/038451
§ 371 (c)(1),
(2) Date: Apr. 15, 2021

(87) PCT Pub. No.: WO2020/079746
PCT Pub. Date: Apr. 23, 2020

(65) Prior Publication Data
US 2021/0389141 A1    Dec. 16, 2021

(51) Int. Cl.
*G01C 21/34*    (2006.01)

(52) U.S. Cl.
CPC ..... *G01C 21/3438* (2013.01); *G01C 21/3461* (2013.01); *G01C 21/3484* (2013.01); *G01C 21/3492* (2013.01)

(58) Field of Classification Search
None
See application file for complete search history.

(56) References Cited

U.S. PATENT DOCUMENTS 9,644,967 B2    5/2017   Yoshizu
9,689,698 B2    6/2017   Wesselius et al.
(Continued)

FOREIGN PATENT DOCUMENTS

CN    103857987 A    6/2014
JP    2006-24194 A    1/2006
(Continued)

*Primary Examiner* — Anne Marie Antonucci
*Assistant Examiner* — Wesam Almadhrhi
(74) *Attorney, Agent, or Firm* — Global IP Counselors, LLP (57) ABSTRACT

A boarding/deboarding point providing system includes a probe vehicle group, a data server, and an on-board unit or a mobile terminal. When vehicle data transmitted from the probe vehicle group are input, the data server extracts a boarding/deboarding point suitable for boarding a vehicle or deboarding a vehicle from the vehicle data, and stores the point while updating the boarding/deboarding point information database. When a request for boarding/deboarding point information is received from the on-board unit or the mobile terminal, the boarding/deboarding point information stored in the boarding/deboarding point information database is searched for a boarding/deboarding point that meets the request conditions, and the search result that includes the boarding/deboarding point is transmitted to the on-board unit or the mobile terminal.

13 Claims, 8 Drawing Sheets

(56) References Cited

U.S. PATENT DOCUMENTS

| | | | |
|---|---|---|---|
| 2007/0005242 A1* | 1/2007 | Kato | G08G 1/096827 |
| | | | 701/467 |
| 2013/0144495 A1* | 6/2013 | Yu | E05F 15/70 |
| | | | 701/49 |
| 2014/0129132 A1* | 5/2014 | Yoshizu | G08G 1/0112 |
| | | | 701/400 |
| 2017/0018183 A1* | 1/2017 | Rosen | G08G 1/13 |
| 2017/0193627 A1* | 7/2017 | Urmson | G01C 21/3617 |
| 2018/0188731 A1* | 7/2018 | Matthiesen | G01C 21/3407 |
| 2018/0328748 A1* | 11/2018 | Chachra | G06Q 50/30 |
| 2019/0137290 A1* | 5/2019 | Levy | G05D 1/0088 |

FOREIGN PATENT DOCUMENTS

| | | |
|---|---|---|
| JP | 2014-516441 A | 7/2014 |
| JP | 2016-176903 A | 10/2016 |
| WO | 2013/005299 A1 | 1/2013 |

\* cited by examiner

BOARDING/DEBOARDING POINT PROVIDING SYSTEM, DATA SERVER, AND BOARDING/DEBOARDING POINT PROVIDING METHOD

CROSS-REFERENCE TO RELATED APPLICATIONS

This application is a U.S. national stage application of International Application No. PCT/JP2018/038451, filed on Oct. 16, 2018.

BACKGROUND

Technical Field

The present disclosure relates to a boarding/deboarding point providing system, a data server, and a boarding/deboarding point provision method for providing boarding/deboarding point information of a vehicle.

Background Information

A meeting place determination device and a method for determining an appropriate place to meet in the future, without requiring the advance inputting of schedules of the people who are to meet is known from the prior art (for example, refer to Japanese Laid-Open Patent Application No. 2006-24194—Patent Document 1). The meeting place determination device has a movement history acquisition unit that acquires the movement history of a plurality of persons, a common location information acquisition unit that extracts common locations from the movement history, and a meeting place determination unit that determines a meeting place based on the extracted common locations.

SUMMARY

Since the conventional device is based on the movement history between current users, information concerning meeting at a place which the users have never been to before cannot be provided. In addition, since the meeting place is determined solely on the basis of the length of stay, there is the problem that it is not possible to meet conditions that change depending on needs, such as the size of the vehicle, the ease with which the door can be opened and closed, etc.

In view of the problems described above, it is an object of the present invention that when a request for boarding/deboarding point information is made from an information terminal, it is possible to provide information regarding a suitable boarding/deboarding point irrespective of areas where boarding/deboarding has never taken place or of various changes in conditions.

In order to realize the object described above, the present disclosure is a boarding/deboarding point providing system comprising a probe vehicle group, a data server, and an information terminal. When vehicle data transmitted from the probe vehicle group are input, the data server extracts a boarding/deboarding point suitable for boarding or deboarding a vehicle, and stores the point while updating the boarding/deboarding point information database. When a request for boarding/deboarding point information is received from an information terminal, the boarding/deboarding point information stored in the boarding/deboarding point information database is searched for a boarding/deboarding point that meets the conditions of the request, and the search result that includes the boarding/deboarding point is transmitted to the information terminal.

Thus, when a request for boarding/deboarding point information is made from an information terminal, it is possible to provide information regarding a suitable boarding/deboarding point irrespective of areas where boarding/deboarding has never taken place or of various changes in conditions.

BRIEF DESCRIPTION OF THE DRAWINGS

Referring now to the attached drawings which form a part of this original disclosure.

DETAILED DESCRIPTION OF EMBODIMENTS

An embodiment for implementing the boarding/deboarding point providing system, the data server, and the boarding/deboarding point provision method according to the present disclosure will be described below based on a first embodiment illustrated in the drawings.

First Embodiment

The boarding/deboarding point providing system according to the first embodiment utilizes each vehicle as a sensor in order to collect a vast amount of probe data, and is incorporated as a part of a probe information system that enables the sharing of various data. The "overall system configuration," "detailed configuration of an on-board unit," "detailed configuration of a data server," and the "detailed configuration of a mobile terminal" will be described separately below with respect to the configuration of the first embodiment.

Overall System Configuration

Figure 1:
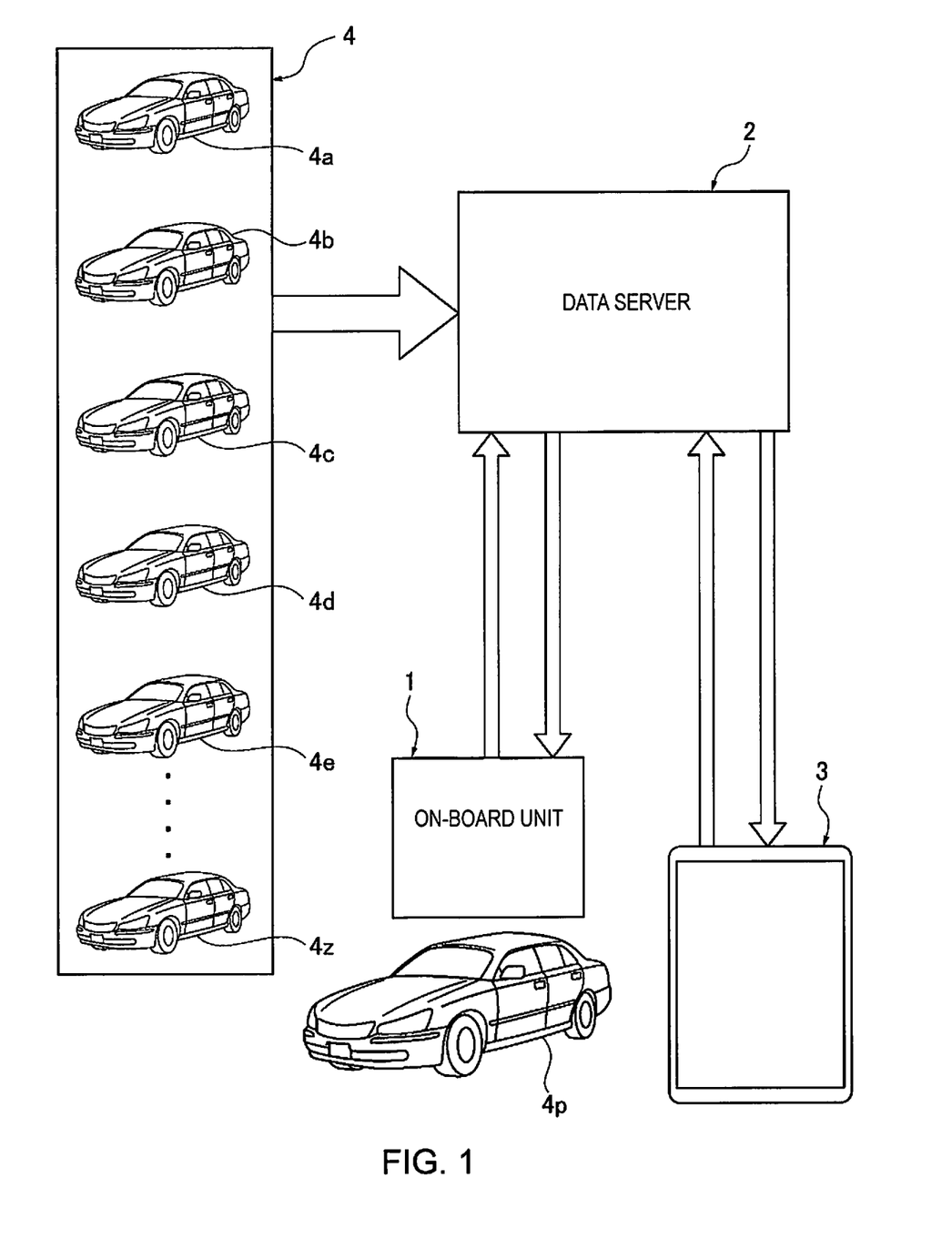
FIG. 1 is a system configuration schematic view illustrating an overall system configuration to which is applied a boarding/deboarding point providing system, a data server, and a boarding/deboarding point provision method according to a first embodiment.

FIG. 1 is an overall system configuration to which is applied a boarding/deboarding point providing system, a data server, and a boarding/deboarding point provision method according to a first embodiment. The overall system configuration will be described below with reference to FIG. 1.

As shown in FIG. 1, the boarding/deboarding point providing system comprises an on-board unit 1 (information terminal: on-board terminal), a data server 2, a mobile terminal 3 (information terminal: mobile terminal), a probe vehicle group 4. The present boarding/deboarding point providing system can be applied to a service that determines a meeting place for vehicles and occupants. For example, the system can be applied to a taxi service that boards a passenger (occupant) onto a vehicle at a meeting place and provides a transportation service. Alternatively, the system can be applied to a so-called rental car or car sharing service, in which an occupant (driver) starts to drive a vehicle from a meeting place.

The on-board unit 1 is mounted on a probe vehicle 4a, such as a robot taxi that utilizes boarding/deboarding point information, and has a probe vehicle function for transmitting vehicle data that include boarding/deboarding point information, and an on-board information terminal function for receiving boarding/deboarding point information that meets request conditions.

Here, the probe vehicle 4p is one vehicle from among numerous probe vehicles 4a, 4b, 4c, 4d, 4e . . . 4z, etc., which constitute the probe vehicle group 4 that plays the role of sensors in the probe information system.

The probe vehicle function refers the accumulation of vehicle data related to travel and making stops over a prescribed period of time, and transmitting the accumulated vehicle data to the data server 2. For example, if the opening and closing of a vehicle door is considered an event, a boarding/deboarding event can be extracted on the basis of vehicle behavior and the before and after state of the vehicle, and the vehicle data that include the boarding/deboarding point information can be transmitted to the data server 2.

The on-board information terminal function refers to a function for receiving boarding/deboarding point information that meets the request conditions when a request for boarding/deboarding point information is transmitted. Here, "request for boarding/deboarding point information" includes system requests in which boarding/deboarding point information required by an on-board dispatch system, such as on a robot taxi, is requested, and driver requests made by means of a driver input operation.

The data server 2, permanently installed in an information management center in the probe information system, receives a large amount of vehicle data transmitted from the probe vehicle group 4 and separates and records the received vehicle data according to, for example, information usage type. The data server 2 has a function for storing the boarding/deboarding point information in a database, and a function for searching/transmitting the boarding/deboarding point information.

When vehicle data transmitted from the probe vehicle group 4 are input, the database storage function is used to analyze and extract from the vehicle data boarding/deboarding points suitable for boarding or deboarding a vehicle and stores this information in a boarding/deboarding point information database. As for the storage of the boarding/deboarding point information database, when vehicle data which are transmitted from the probe vehicle group 4 one after another are input for the first time, the boarding/deboarding points are analyzed and extracted, and the stored content of the boarding/deboarding point information database is updated using a learning control method. In the analysis and extraction of the boarding/deboarding points, the boarding/deboarding points and the usage tendencies are extracted by means of analysis based on the boarding/deboarding events of the probe vehicle group 4.

When a request for boarding/deboarding point information is received from an information terminal, the search/transmit function is used to search boarding/deboarding events stored in the boarding/deboarding point information database for a boarding/deboarding point that meets the request conditions, and the search result that includes the boarding/deboarding point is transmitted to the information terminal. That is, that required information that includes the boarding/deboarding point is proposed on the basis of the particular situation and search conditions of each user. Information terminals include on-board terminals realized by the on-board unit 1 and mobile terminals realized by the mobile terminal 3.

The mobile terminal 3 is an information terminal carried by the user of the boarding/deboarding point information, and when a request for the boarding/deboarding point information is transmitted, the search result that includes the boarding/deboarding point meeting the request conditions is received. The received search result that includes the boarding/deboarding point is displayed (list display, map display) on the screen of the mobile terminal 3.

Detailed Configuration of the On-Board Unit

Figure 2:
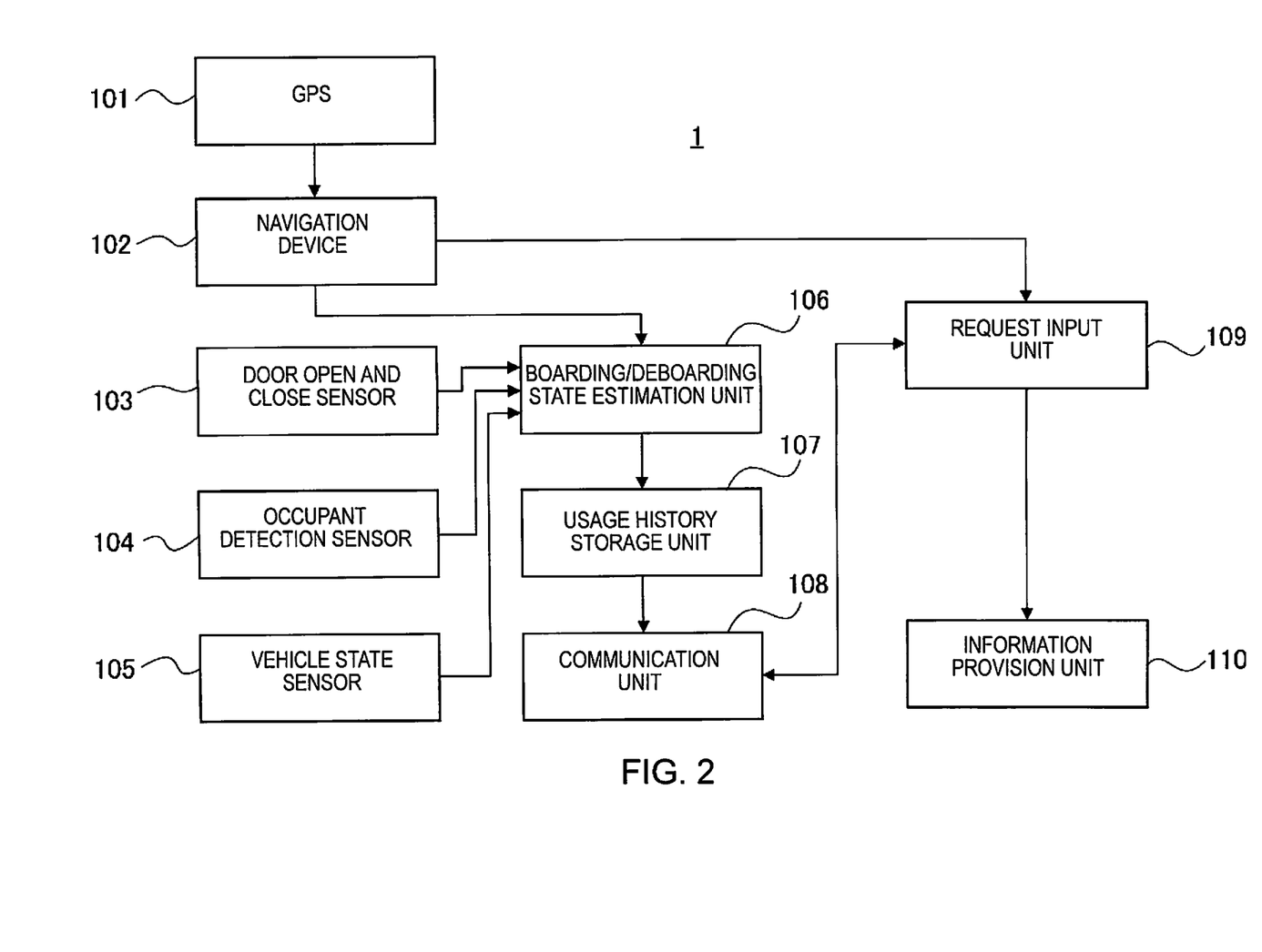
FIG. 2 is a block diagram illustrating a configuration of an on-board unit in the boarding/deboarding point providing system.

FIG. 2 illustrates a configuration of the on-board unit 1 in the boarding/deboarding point providing system. The detailed configuration of the on-board unit 1 will be described below with reference to FIG. 2.

As shown in FIG. 2, the on-board unit 1 includes a GPS 101, a navigation device 102, a door open and close sensor 103, an occupant detection sensor 104, and a vehicle state sensor 105. In addition, a boarding/deboarding state estimation unit 106, a usage history storage unit 107, a communication unit 108, a request input unit 109, and an information provision unit 110 are also provided.

The GPS 101 acquires the current location information (longitude/latitude) of the probe vehicle 4p. "GPS" is an acronym for "Global Positioning System." The navigation device 102 calculates a route from the current location to the destination on the map data and provides route guidance pertaining to the location on the road on which the probe vehicle 4p is currently traveling. The GPS 101 and the navigation device 102 are then able to specify the location of the probe vehicle 4p on the map where the boarding/deboarding event is taking place.

The door open and close sensor 103, the occupant detection sensor 104, and the vehicle state sensor 105 are used by the boarding/deboarding state estimation unit 106 for determining whether a boarding/deboarding event of the probe vehicle 4p is occurring. The door open and close sensor 103 is provided on each door and detects the open or closed state of the door. The occupant detection sensor 104 detects changes in the number of occupants following boarding/deboarding by various methods, such as recognition by means of a camera, determination of seatbelt use, etc. The vehicle state sensor 105 is used for acquiring information such as the shift state and the speed of the vehicle.

Here, when the number of occupants increases after the probe vehicle 4p stops and the door is opened, the boarding/deboarding state estimation unit 106 determines that a boarding event is occurring. When the number of occupants decreases, on the other hand, after the probe vehicle 4p stops and the door is opened, it is determined that a deboarding event is occurring.

The usage history storage unit 107 records points at which boarding/deboarding events have occurred as determined by the boarding/deboarding state estimation unit 106. The usage history storage unit 107 learns the vehicle's movement history, travel history, and boarding/deboarding state history, and sends the necessary information to the data server 2.

When the on-board unit 1 executes the probe vehicle function, the communication unit 108 transmits the boarding/deboarding point information where the boarding/deboarding event occurred, which is stored in the usage history storage unit 107. When the on-board unit 1 executes the on-board terminal function, the communication unit 108 transmits a request for the boarding/deboarding point information and receives the boarding/deboarding point search result from the data server 2.

The request input unit 109 has buttons and a touch panel with which it is possible to carry out a request input operation. The information provision unit 110 has a liquid-crystal display, or the like, that is capable of presenting the boarding/deboarding point search result to the user.

Detailed Configuration of the Data Server

Figure 3:
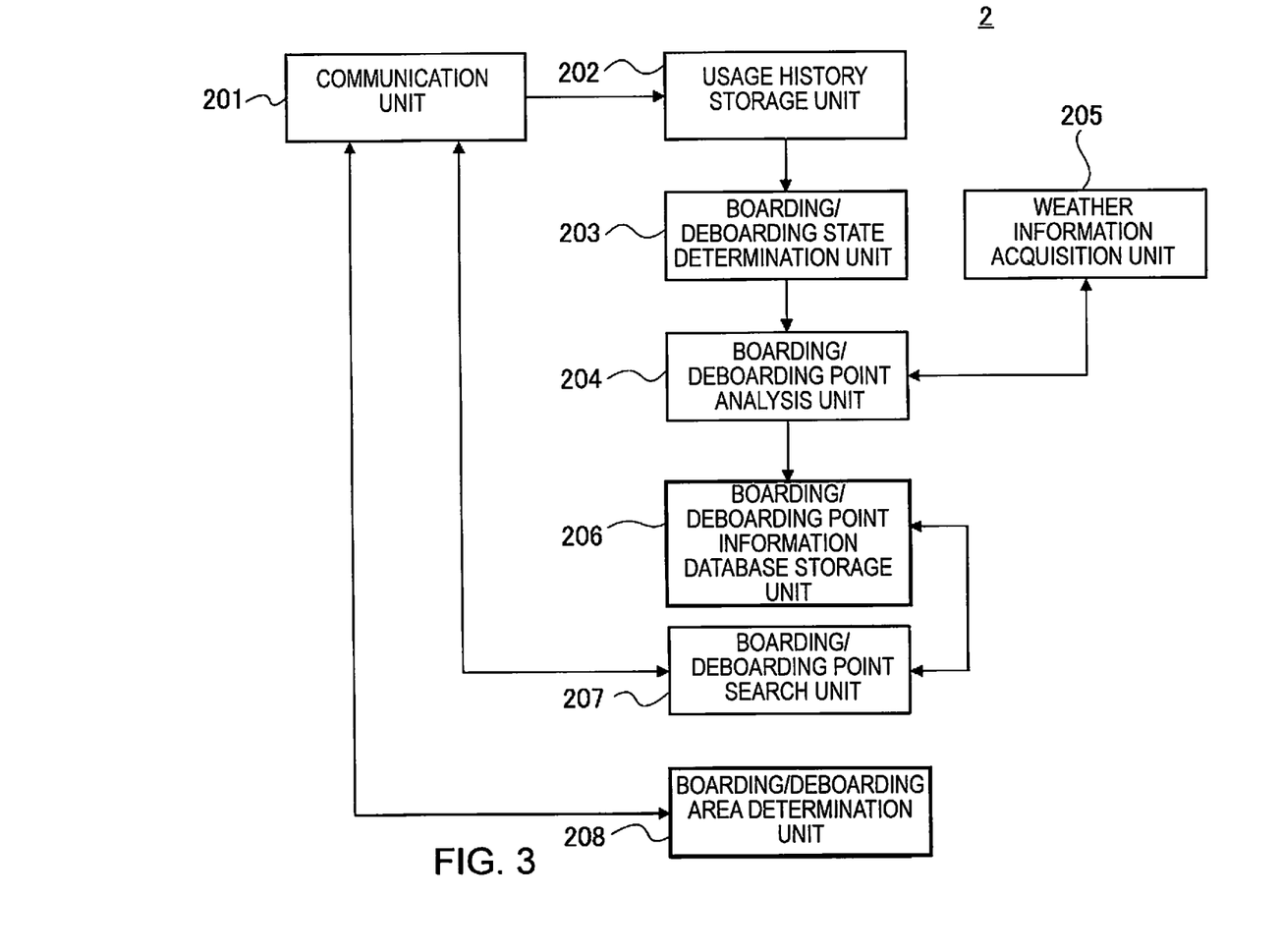
FIG. 3 is a block diagram illustrating a configuration of the data server in the boarding/deboarding point providing system.

FIG. 3 illustrates a configuration of the data server 2 in the boarding/deboarding point providing system. The detailed configuration of the data server 2 will be described below with reference to FIG. 3.

As shown in FIG. 3, the data server 2 has a communication unit 201, a usage history information storage unit 202, a boarding/deboarding state determination unit 203, a boarding/deboarding point analysis unit 204 (boarding/deboarding point extraction unit), a weather information acquisition unit 205, and a boarding/deboarding point information database storage unit 206. A boarding/deboarding point search unit 207 (boarding/deboarding point transmission unit) and a boarding/deboarding area determination unit 208 are also provided.

The communication unit 201 communicates with various devices. When the data server 2 executes the database storage function with respect to the boarding/deboarding point information, the communication unit acquires vehicle data from the probe vehicle group 4 and outputs the vehicle data to the usage history information storage unit 202. When the data server 2 executes the search/transmit function with respect to the boarding/deboarding point information, the communication unit receives a request from an information terminal and outputs the request to the boarding/deboarding point search unit 207 and the boarding/deboarding area determination unit 208. Then, the boarding/deboarding point search result and the boarding/deboarding area determination result from the boarding/deboarding point search unit 207 and the boarding/deboarding area determination unit 208 are transmitted to the information terminal. The communication unit 201 corresponds to a boarding/deboarding data acquisition unit that acquires boarding/deboarding data, which include at least the stop points where a vehicle in the probe vehicle group 4 stopped.

The usage history storage unit 202 accumulates vehicle data, such as boarding/deboarding event data, input via the communication unit 201 by means of transmission from the probe vehicle group 4.

The boarding/deboarding state determination unit 203 determines whether the boarding/deboarding state is a target for analysis based on the vehicle data stored in the usage history storage unit 202. Specifically, the compatibility/incompatibility as a boarding/deboarding point is determined, and the unnecessary, incompatible determination data are removed.

The boarding/deboarding point analysis unit 204 inputs boarding/deboarding events from the boarding/deboarding state determination unit 203 and weather information from the weather information acquisition unit 205 and carries out a statistical analysis of the characteristics of each boarding/deboarding point. The boarding/deboarding point analysis unit 204 carries out an analysis that includes the boarding/deboarding history of other vehicles in order to extract boarding/deboarding points that can be designated as boarding points or deboarding points that can be utilized by an unspecified number of people. The weather information acquisition unit 205 acquires the weather for the time and date on which a boarding/deboarding point event occurred.

The boarding/deboarding point information database storage unit 206 stores the analysis result from the boarding/deboarding point analysis unit 204. The boarding/deboarding point information database storage unit 206 creates a database from the boarding/deboarding point data extracted on the basis of the results of analysis of the boarding/deboarding point analysis unit 204, and the boarding/deboarding point information database is updated and stored. Here, the "boarding/deboarding point information database" is a database that stores trends analyzed for each boarding/deboarding point.

When a request for boarding/deboarding point information is received, the boarding/deboarding point search unit 207 searches the boarding/deboarding point information database that is stored in the boarding/deboarding point information database storage unit 206 for a boarding/deboarding point that can be used, and outputs the search result (a boarding/deboarding point list, or the like) to the communication unit 201. The boarding/deboarding point search unit 207 searches for boarding/deboarding points that meet the request conditions specified by the user.

When an appropriate boarding/deboarding area between two users is to be acquired, the boarding/deboarding area determination unit 208 determines the boarding/deboarding area based on the current location of the two users.

Detailed Configuration of the Mobile Terminal

Figure 4:
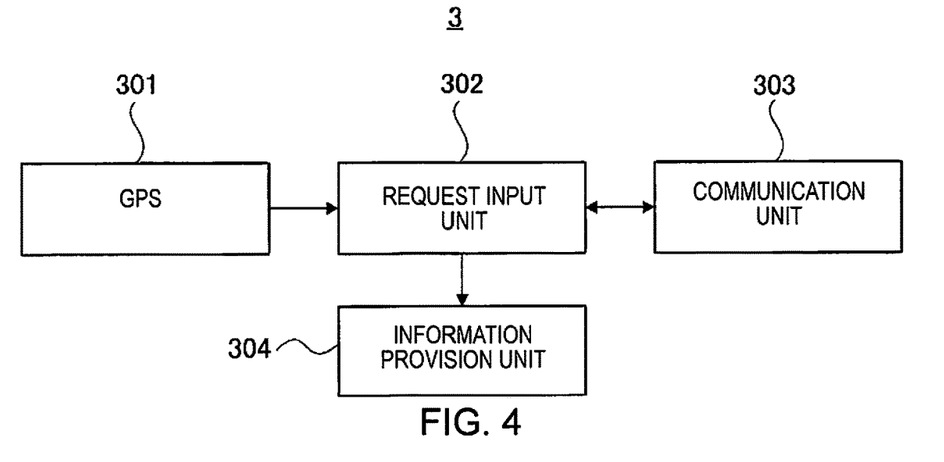
FIG. 4 is a block diagram illustrating a configuration of a mobile terminal in the boarding/deboarding point providing system.

FIG. 4 illustrates a configuration of a mobile terminal in the boarding/deboarding point providing system. The detailed configuration of the mobile terminal 3 will be described below with reference to FIG. 4.

As shown in FIG. 4, the mobile terminal 3 includes a GPS 301, a request input unit 302, a communication unit 303, and an information provision unit 304.

The GPS 301 acquires information regarding the current location (longitude/latitude) of the user who has the mobile terminal 3. The request input unit 302 has a touch panel screen, or the like, with which the user can carry out a request input operation. The communication unit 303 transmits a request for the boarding/deboarding point information, and receives the boarding/deboarding point search result from the data server 2. The information provision unit 304 displays the search result on the screen of the mobile terminal 3 as a list display or a map display.

Next, the operation of the first embodiment will be described separately with respect to the "background art and request resolution measures," the "probe vehicle transmission operation," the "boarding/deboarding information database generation operation in the data server," the "boarding/deboarding point information provision operation to the information terminal," and the "processing operation with respect to the recorded contents when the probe vehicle is stopped."

Background Technology and Request Resolution Measures

When a meeting place is in the vicinity of a train station or the like, one may encounter many unfamiliar places or not know where to stop; thus, one may wish to find a place to stop or wait for a certain period of time.

In addition, when one boards or deboards a vehicle, the conditions that should be prioritized will differ from time to time, such as difficulty in moving due to the large size of the vehicle, the need to board or deboard immediately because a vehicle is approaching from behind, there are a large number of people, boarding/deboarding take time because of luggage, etc.

Thus, there is a demand for a system that is able to provide information concerning suitable boarding/deboarding points irrespective of areas where boarding/deboarding has never taken place or of various changes in conditions. In particular, in a robot taxi, it is necessary to board a passenger at a boarding point when the taxi is unoccupied, and to deboard a passenger at a deboarding point when the taxi is occupied. In addition, in order to generate a target travel route, an autonomous driving vehicle must determine a stopping point at which an occupant will board/deboard. Thus, robot taxis and autonomous driving vehicles place more demands on a system that is able to provide information on suitable boarding/deboarding points.

In response to the demand for the provision of information regarding boarding/deboarding points described above, we focused on the vast probe information that is collected by utilizing each vehicle as a sensor, and made it possible to analyze and extract points suitable for boarding/deboarding vehicles, to find boarding/deboarding points that suit the current situation and conditions. That is, when vehicle data transmitted from the probe vehicle group 4 are input, the data server 2 extracts a boarding/deboarding point suitable for boarding a vehicle or deboarding a vehicle from the vehicle data, and stores the point while updating the boarding/deboarding point information database. A boarding/deboarding point providing system was adopted, in which, when a request for boarding/deboarding point information is received from an information terminal, the boarding/deboarding point information stored in the boarding/deboarding point information database is searched for a boarding/deboarding point that meets the request conditions, and the search result that includes the boarding/deboarding point is transmitted to the information terminal.

Thus, on the data server 2 side, when vehicle data transmitted from the probe vehicle group 4 are received by the data server 2, the data server 2 extracts a boarding/deboarding point suitable for boarding a vehicle or deboarding a vehicle from the vehicle data. Then, the boarding/deboarding point information database generated from the boarding/deboarding point information extracted as boarding/deboarding points is updated based on the reception of the vehicle data and stored in the data server 2.

On the user side, when a request for boarding/deboarding point information is transmitted from an information terminal to the data server 2, the data server 2 that receives the request searches the boarding/deboarding point information stored in the boarding/deboarding point information database for a boarding/deboarding point that meets the request conditions. When the boarding/deboarding point is retrieved, the data server 2 then transmits the search result that includes the searched boarding/deboarding point to the information terminal. That is, the information terminal receives from the data server 2 information on the search result that includes the boarding/deboarding point that meets the request conditions.

In this manner, a boarding/deboarding point information database which is used to search for boarding/deboarding point information that meets the request conditions is generated based on the vehicle data transmitted from an unspecified number of probe vehicle groups 4 that have different travel areas and that are subject to different conditions. As a result, when a request for boarding/deboarding point information is made from an information terminal, it is possible to provide information regarding a suitable boarding/deboarding point irrespective of areas where boarding/deboarding has never taken place or of various changes in conditions.

Probe Vehicle Transmission Operation

Figure 5:
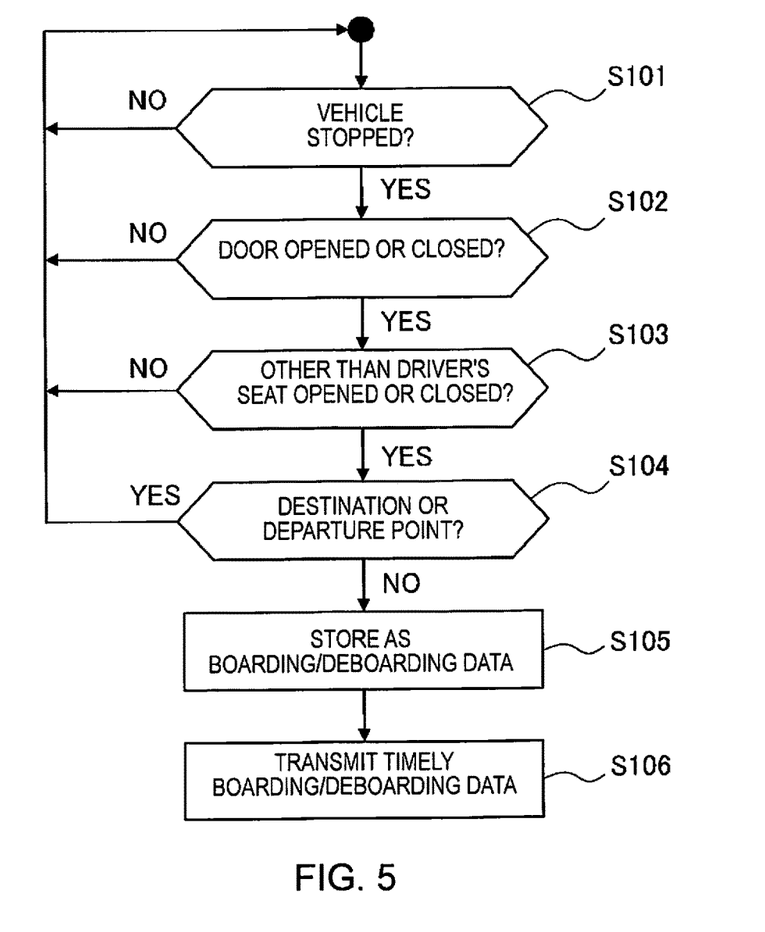
FIG. 5 is an operational flowchart illustrating a transmission operation of boarding/deboarding data from a probe vehicle.

FIG. 5 illustrates the operation of transmitting boarding/deboarding data from a probe vehicle. The probe vehicle transmission operation will be described below with reference to FIG. 5.

A stop is recognized based on the speed of the probe vehicle, and a stop event is acquired depending on whether the vehicle has been stopped for a prescribed period of time (for example, about two minutes) or more (S101). In addition, since a boarding/deboarding point is determined based on whether boarding/deboarding has been carried out, the door open and close sensor 103 detects whether a door has been opened or closed (S102). In addition, the opening/closing of a door shall only pertain to the opening/closing of doors other than the driver's seat door such that a stop event involving the opening/closing of only the driver's seat door is not utilized as a boarding/deboarding point (S103).

The event point and the situation where a door was opened or closed are temporarily stored, and after the trip of the vehicle has been completed, it is determined that the previous event point is not a destination or a departure point of the trip (S104). Here, for example, when the vehicle (power or engine) is turned OFF and the OFF time is equal to or greater than a certain threshold value (for example, about 30 minutes), the event point is determined to be a destination or a departure point; otherwise, it is determined that it is not a destination or a departure point.

When it is determined that it is not a destination or a departure point, the data of the boarding/deboarding event are temporarily stored in the vehicle (S105), and the data of the boarding/deboarding event are transmitted to the data server 2 at a timing at which timely communication is possible (S106).

Figure 6:
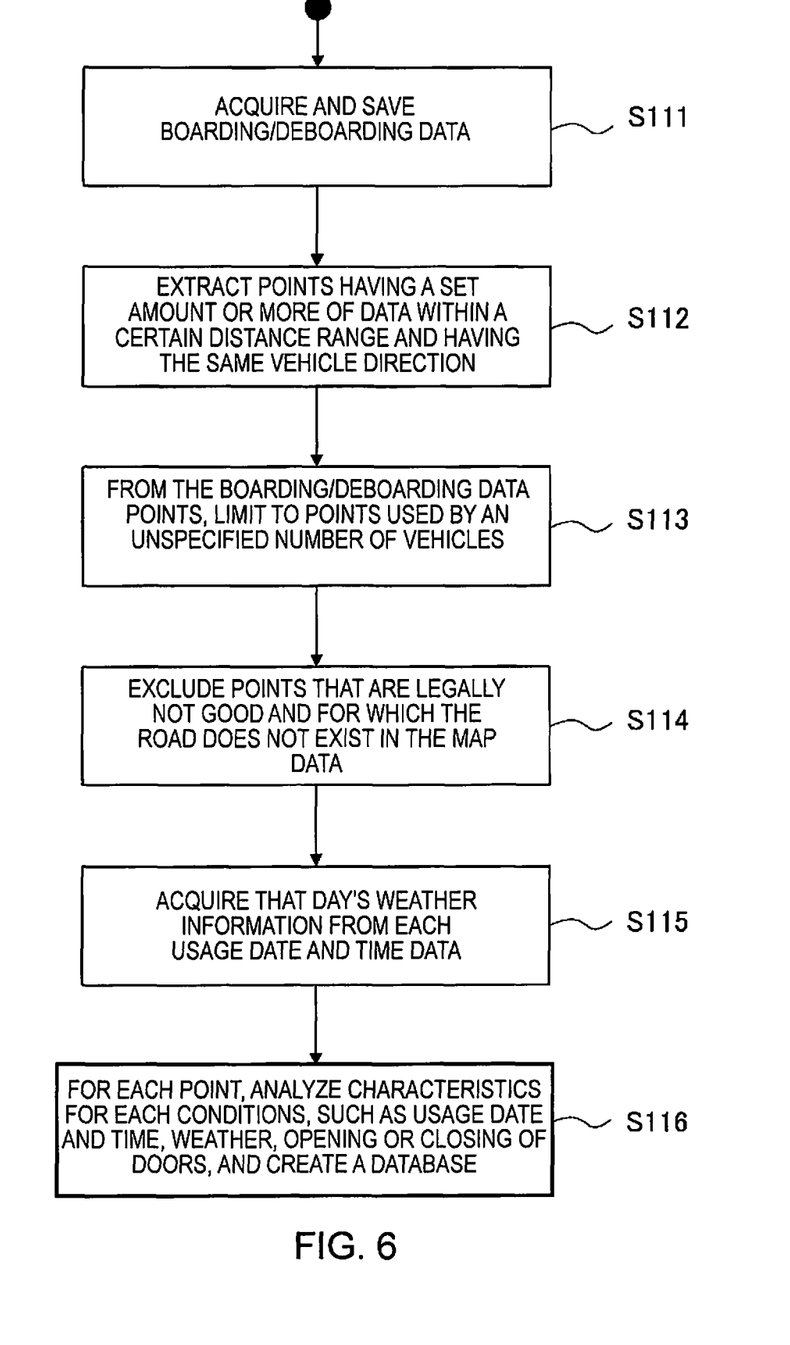
FIG. 6 is an operational flowchart illustrating a generation operation of the boarding/deboarding point information database in a data server that has received boarding/deboarding data from a probe vehicle group.

Boarding/Deboarding Information Database Generation Operation in the Data Server FIG. 6 illustrates a generation operation of the boarding/deboarding point information database in the data server 2 that has received boarding/deboarding data from a probe vehicle group 4. The boarding/deboarding information database generation operation in the data server 2 will be described below with reference to FIG. 6.

Log data sent from the probe vehicle group 4 are stored (S111) in the data server 2, and the stored boarding/deboarding data are analyzed for boarding/deboarding points. At this time, boarding/deboarding data within a certain radial range (for example, about 10 m) and having the same travel direction (or vehicle orientation) are considered to be a boarding/deboarding point at the same point. Then, points for which there is a set number or more (for example, about 20 times) pieces of boarding/deboarding data are extracted as subjects of analysis (S112). In addition, of the extracted points, only data utilized by an unspecified number of vehicles (more than half, or 20 or more of the number of times of boarding/deboarding, are of different vehicles) are considered as boarding/deboarding points (S113).

In addition, areas where standing is prohibited by law are excluded, and data on areas without road information (mainly considered to be private land) are also excluded (S114). By means of analysis and aggregation based on the boarding/deboarding data utilized at the target point, it is possible to find the characteristics of each point. Past weather information is acquired based on the date and time of each piece of boarding/deboarding data, and the weather information is appended (S115).

Then, for each boarding/deboarding point, trends (characteristics) for each boarding/deboarding point and various conditions are analyzed to create a database and generate a boarding/deboarding point information database (S116). Here, the various conditions include changes in the utilization trend at each point depending on the day of the week and time of day, whether there is a utilization trend depending on the size of the vehicle, whether the utilization trend is different between rainy weather and non-rainy weather, the average stop time and the dispersion degree thereof, etc. In addition, the various conditions also include whether the driver's seat side door is open, and whether the trunk or a rear door is open, based on the open/closed state of doors.

Figure 7:
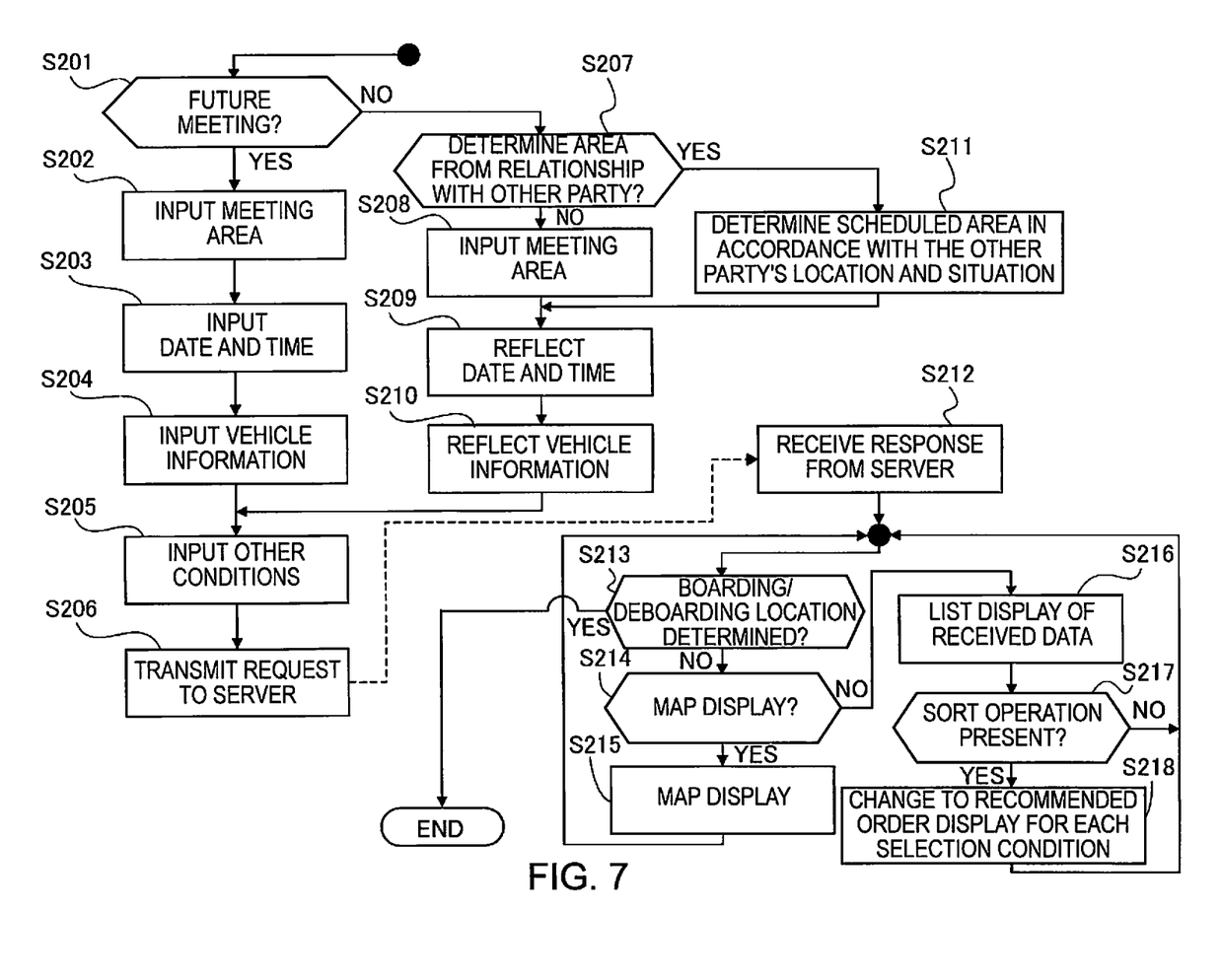
FIG. 7 is an operational flowchart illustrating a screen display operation of boarding/deboarding point information when receiving boarding/deboarding data transmitted from a data server based on a request input from a user.
Figure 8:
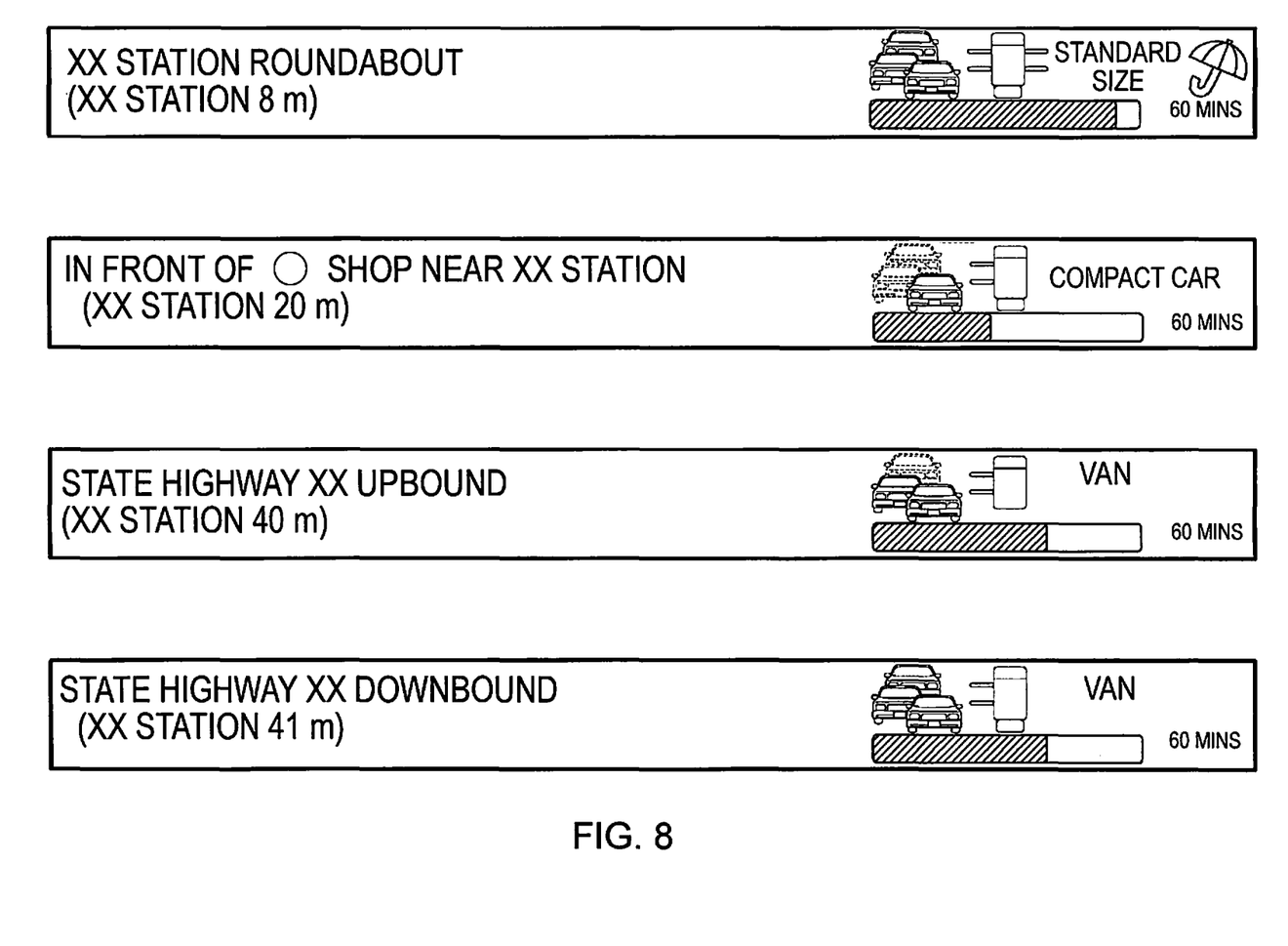
FIG. 8 is a list display diagram illustrating one example of a list display of boarding/deboarding points according to received data.
Figure 9:
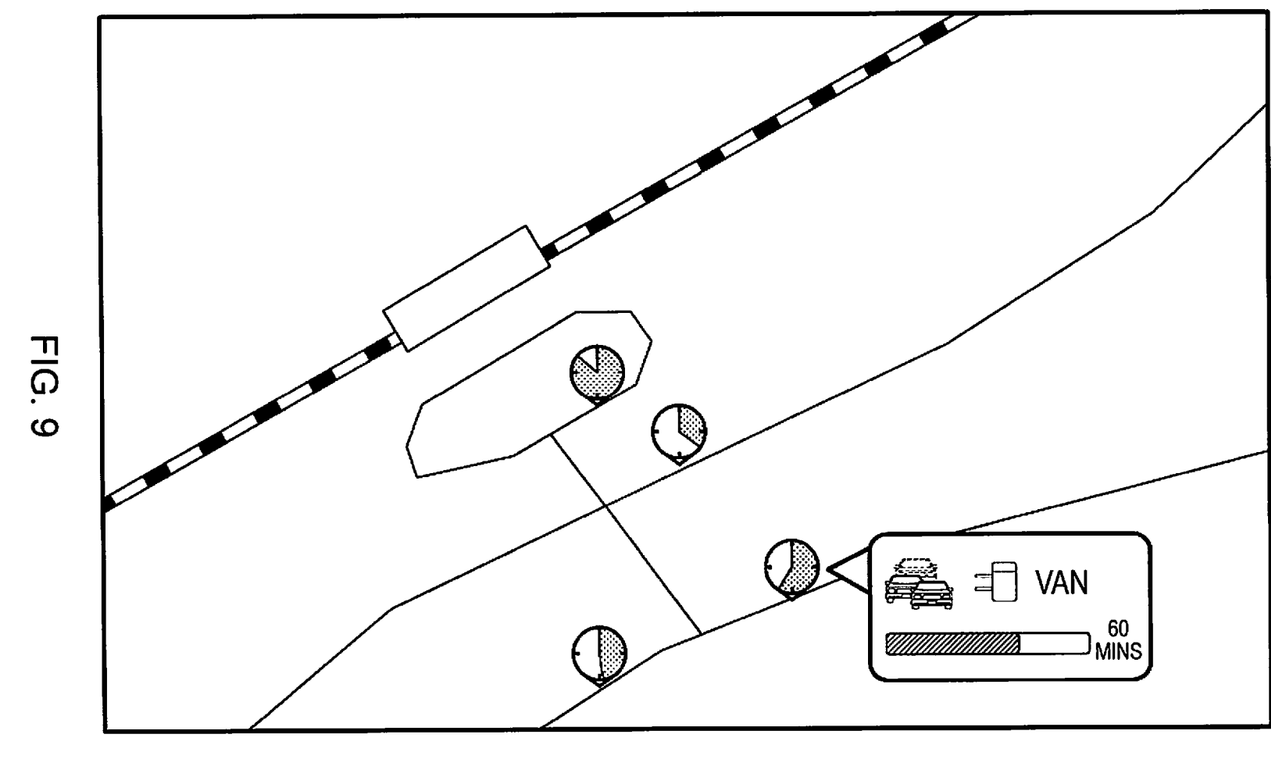
FIG. 9 is a map display diagram illustrating one example of a map display of boarding/deboarding points according to received data.

Boarding/Deboarding Point Information Provision Operation to the Information Terminal FIG. 7 illustrates a screen display operation of boarding/deboarding point information when boarding/deboarding data transmitted from the data server 2 based on a request input from a user is received. FIG. 8 illustrates one example of a list display of boarding/deboarding points according to received data. FIG. 9 illustrates one example of a map display of boarding/deboarding points according to received data. The boarding/deboarding point information provision operation to the information terminal will be described below with reference to FIGS. 7-9.

From the user side, a meeting place with a vehicle (the vehicle's boarding/deboarding point) is searched using an on-board terminal (on-board unit 1) or a mobile terminal (mobile terminal 3).

In the case of a previously scheduled meeting (YES in S201), the expected area for the meeting is input (S202), the date and time are input (S203), vehicle information such as the size of the vehicle is input (S204), other conditions are input (S205), and a request is sent to the data server 2 (S206).

Here, "input of other conditions" refers to conditions that are input if necessary, such as whether it would take time to board, and it is easy to use even in the rain.

In the case of a last-minute meeting (NO in S201) rather than a previously scheduled meeting, and when the user determines the area (NO in S207), the meeting area is input (S208), the date and time are reflected (S209), and the information on the vehicle to be used is reflected (S210). Then, the other conditions are input if needed (S205) and a request is sent to the data server 2 (S206).

In the case of a last-minute meeting (NO in S201) rather than a previously scheduled meeting, and when an area is specified in accordance with the positional relationship between the vehicle and the person to meet (YES in S207), an area that is in the middle in terms of distance or time between the vehicle position and the user location is specified by the server (S211). Then, the date and time are reflected (S209), and the information on the vehicle to be used is reflected (S210). Then, the other conditions are input if needed (S205) and a request is sent to the data server 2 (S206).

The data server 2 that receives the request transmission transmits to the information terminal the boarding/deboarding point information of the same day of the week and time of day, based on the input area and date and time information. Thus, the information terminal receives boarding/deboarding point information from the data server 2 (S212). When the boarding/deboarding point information is received, it is determined whether the boarding/deboarding location has been determined (S213), and if it is determined that the boarding/deboarding location has not been determined, it is determined whether it is in a map display (S214). When it is determined that it is in a map display, the map of FIG. 9 is displayed (S215), and the process returns to Step S213, which is the step to determine whether the boarding/deboarding location has been determined.

When it is determined that it is not in a map display, the list of received data of FIG. 8 is displayed (S216), it is determined whether a sorting operation has been carried out (S217), the recommended order display is changed for each selected condition if there has been a sorting operation (S218), and the process returns to Step S213, which is the step to determine whether the boarding/deboarding location has been determined. When there has not been a sorting operation, the process directly returns to Step S213, which is the step to determine whether the boarding/deboarding location has been determined.

On the other hand, if the boarding location is determined in S213, the process proceeds directly to END. That is, after the boarding/deboarding location is determined, it becomes possible to choose to provide guidance to the boarding location by means of navigation, sending the location to the person to meet by email, and the like.

As shown in FIG. 8, in a "list display," for example, boarding/deboarding point candidates are displayed, by text, in the left-side space of each of four display frames. Then, the average stop time is expressed on the right-side space of each list display frame. In addition, whether many vehicles are utilizing the location, which door is likely to be opened, and the maximum vehicle size that is likely to be easy to use are displayed by means of icons or text. An umbrella icon is often used when rainy weather is also added.

As shown in FIG. 9, in the "map display," for example, four boarding/deboarding point candidates are displayed on the map of the boarding/deboarding area using clock-like icons, and the average stop times are expressed using the angular area of the long hand of the clock part. In addition, by carrying out a sorting operation by selecting and touching one of the four icons of the boarding/deboarding point candidates, it is possible to display detailed trends. Here, detailed trends refer to whether many vehicles are utilizing the location, which door is likely to be opened, and the maximum vehicle size that is likely to be easy to use, etc., similarly to the case of a list display.

Processing Operation with Respect to the Recorded Contents when the Probe Vehicle is Stopped Examples in which boarding/deboarding data, which are recorded each time a probe vehicle stops and that are transmitted to the data server 2, are recorded as log data, and examples in which the recorded log data are processed as boarding/deboarding places will be described. Examples of recording log data each time a probe vehicle stops include the following (A) to (F). For example, the following (A) to (F) are recorded in association with each other as the log data at the time of each stop. Data obtained by processing the log data as the boarding/deboarding places are transmitted to the information terminal as the search result.

(A) Date and Time

<Recorded Log Data: Data Indicating the Date and Time and Time of Day (for Example, Morning, Noon, Night)>
When processing as a boarding/deboarding place: log data collected for the corresponding time of day are extracted in accordance with the time of day for usage included in the request transmission.

(B) Weather, Temperature

<Recorded Log Data: Data Indicating the Weather (for Example, Sunny, Cloudy, Rain) and Temperature (for Example, XX° C.>
When processing as a boarding/deboarding place: if there is a history of use on a rainy day, data for displaying incidental information indicating that there is a history of use on a rainy day in association with the boarding/deboarding place (for example, with an umbrella for indicating rain, or a sun icon for indicating sunny weather) are generated.

(C) Stop Location Information

<Recorded Log Data: Longitude and Latitude when the Vehicle is Stopped and Name of POI (Name Set for a Prescribed Cell Range)>
When processing as a boarding/deboarding place: for example, the stop location information (longitude/latitude or POI) utilized by a plurality of vehicles and where vehicles have stopped for a prescribed period of time or more is registered as a boarding/deboarding place.

(D) Vehicle Attributes

<Recorded log data: vehicle model name, type (SUV, sedan, etc.), size, vehicle classification (commercial vehicle, privately owned car, autonomous driving vehicle, robot taxi, etc.)>
When processing as a boarding/deboarding place, log data of vehicles of the corresponding vehicle model, type, and size that have stopped are extracted in accordance with the vehicle model to be used included in the request transmission. The boarding/deboarding places of the same or similar vehicles are preferentially displayed in accordance with the classification of vehicle to be used/met.

(E) Stop Time

<Recorded Log Data: Wait Time Until the Vehicle Stops (Time Required Until the Vehicle Stops After Entering a Prescribed Radius that Includes the Stop Point), Time that the Vehicle was Stopped (from Arrival at the Stop Point Until Departure)>
When processing as a boarding/deboarding place: data for displaying the rough stop time and wait time till stopping (degree of congestion) are generated in association with the boarding/deboarding place.

(F) Operation of the Vehicle when the Vehicle is Stopped

<Recorded Log Data: Presence/Absence of Opening/Closing of a Door/Trunk, Position of the Opened or Closed Door/Trunk>
When processing as a boarding/deboarding place: data for displaying the position of the door that was opened or closed, when the vehicle is stopped, are generated in association with the boarding/deboarding place.

As described above, the following effects are exhibited by the boarding/deboarding point providing system, the data server, and the boarding/deboarding point provision method according to the first embodiment.

(1) A boarding/deboarding point providing system comprising the probe vehicle group 4, the data server 2, and the information terminals (on-board unit 1, mobile terminal 3), wherein when inputting vehicle data transmitted from the probe vehicle group 4, the data server 2 extracts from the vehicle data a boarding/deboarding point suitable for boarding a vehicle or deboarding a vehicle and stores the point while updating the boarding/deboarding point information database, and when receiving a request for boarding/deboarding point information from an information terminal (on-board unit 1, mobile terminal 3), searches for a boarding/deboarding point that meets the request conditions from the boarding/deboarding point information stored in the boarding/deboarding point information database, and transmits the search result that includes the boarding/deboarding point to the information terminal (on-board unit 1, mobile terminal 3) (FIG. 1). Thus, when a request for boarding/deboarding point information is made from an information terminal, it is possible to propose a boarding/deboarding point providing system that provides information regarding a suitable boarding/deboarding point irrespective of areas where boarding/deboarding has never taken place or of various changes in conditions.

(2) A data server 2 that inputs vehicle data transmitted from the probe vehicle group 4, having a boarding/deboarding data acquisition unit (communication unit 201) that acquires boarding/deboarding data, which include the stop point at which a vehicle in the probe vehicle group 4 stopped, a boarding/deboarding point extraction unit (boarding/deboarding point analysis unit 204) that extracts a boarding/deboarding point that can be designated as the boarding point or deboarding point, based on the stop point of the boarding/deboarding data from the boarding/deboarding data acquisition unit (communication unit 201), the boarding/deboarding point information database storage unit 206 that updates and stores the boarding/deboarding point extracted by the boarding/deboarding point extraction unit (boarding/deboarding point analysis unit 204) as the boarding/deboarding point information database, and a boarding/deboarding point transmission unit (boarding/deboarding point search unit 207) that, when a request for boarding/ deboarding point information is received, transmits a search result that includes the boarding/deboarding point searched using the boarding/deboarding point information database (FIG. 3). Thus, it is possible to provide a data server 2 that is able to acquire boarding/deboarding point candidates by searching the latest boarding/deboarding point information based on the boarding/deboarding point information database, which is updated and stored. That is, since the boarding/deboarding point information database updates the boarding/deboarding point information based on newly acquired boarding/deboarding data, the searched boarding/deboarding point information will not be the boarding/deboarding point at a certain stage, but rather the latest boarding/deboarding point.

(3) The boarding/deboarding data include at least stop data, which is the time that a vehicle was stopped, and when the stop time is longer than a prescribed period of time, the boarding/deboarding point information database storage unit 206 stores the stop data in the boarding/deboarding point information database (FIG. 3). Thus, it is possible to omit stop information that is incompatible with a boarding/deboarding place, by regarding a boarding/deboarding point where a vehicle stopped for a prescribed period of time or longer as stop information that is subject to information updating.

(4) The boarding/deboarding data include date and time/location information data which include at least the date and time at which the vehicle stopped and the boarding or deboarding point, and the boarding/deboarding point information database storage unit 206 stores the date and time/location information data in the boarding/deboarding point information database (FIG. 3). Thus, it is possible to search for the boarding/deboarding point based on the usage status of the boarding/deboarding point, which fluctuates depending on the day of the week and the time of day, and to search for a boarding/deboarding point that can be more easily utilized at the current date and time.

(5) Boarding/deboarding data include weather data when the vehicle was stopped, the boarding/deboarding point information database storage unit 206 stores the weather data in the boarding/deboarding point information database, and the search result includes weather data associated with the boarding/deboarding point (FIG. 3). Thus, by adding the weather information at the time of data acquisition, it is possible to respond to changes in the utilization trend due to weather, such as rainy weather, and to search for a boarding/deboarding point that is suitable for current weather conditions. In addition, it is possible to provide weather information, which tends to be utilized, and to thereby provide information with which it is possible to discern whether usage will increase or decrease depending on weather conditions.

(6) The search result includes information that visually indicates the level of the stop time corresponding to the stop data for the boarding/deboarding point (FIG. 8). Thus, it can be easily understood whether it is a place where it is easy to stop a car or a place where one would need to immediately move after boarding/deboarding, by displaying the stop time as a level, when displaying the boarding/deboarding point candidates.

(7) The boarding/deboarding data include door open/close data regarding the position of the door that was opened or closed or the time that the door was opened or closed, when the vehicle was stopped, and the boarding/deboarding point information database storage unit 206 stores the door open/close data in the boarding/deboarding point information database (FIG. 3). The position of the door that was opened or closed may be the position of a door that was at least opened, or it may be the position of a door that was opened and subsequently closed. The time that the door was opened or closed is at least the time that the door was opened, and it may be the time from when the opening of a door is detected until the closing of the door is detected. Thus, by including the opened or closed state of the door and the position of the door that is being opened or closed when the vehicle is stopped, it is possible to search for or ascertain the boarding/deboarding point, and including ascertaining whether putting luggage in and out of the vehicle is easy, and whether it is also to open the driver side door.

(8) The boarding/deboarding data include attribute data, which are information relating to the attributes of the stopped vehicle, and when there is a plurality of boarding/deboarding point candidates, the boarding/deboarding point transmission unit (boarding/deboarding point search unit 207) refers to the vehicle's attribute data, and transmits a search result without including, in the boarding/deboarding point candidates, boarding/deboarding points where only vehicles that are smaller than the vehicle scheduled to be dispatched have stopped (FIG. 8). Thus, by analyzing the boarding/deboarding points that include the size of the vehicle as part of the stop data, it is possible to investigate places where vehicles of a characteristic size, such as a large vehicle, do not stop, and to provide appropriate boarding/deboarding point information that matches the current vehicle size.

(9) A boarding/deboarding point provision method achieved by communication between the probe vehicle group 4, the data server 2, and the information terminal (on-board unit 1, mobile terminal 3), comprising when the vehicle data transmitted from the probe vehicle group 4 are received by the data server 2, extracting a boarding/deboarding point suitable for boarding a vehicle or deboarding a vehicle from the vehicle data, updating and storing a boarding/deboarding point information database generated from information extracted as boarding/deboarding points in the data server 2, when the request for boarding/deboarding point information is transmitted from an information terminal (on-board unit 1, mobile terminal 3) to the data server 2, searching the data server 2 that receives a request for a boarding/deboarding point that meets the request conditions from the boarding/deboarding point information stored in the boarding/deboarding point information database, and when the boarding/deboarding point is searched (FIG. 7), transmitting the search result that includes the searched boarding/deboarding point from the data server 2 to the information terminal (on-board unit 1, mobile terminal 3). Thus, when a request for boarding/deboarding point information is made from an information terminal, it is possible to propose a boarding/deboarding point provision method that provides information on a suitable boarding/deboarding point irrespective of areas where boarding/deboarding has never taken place or of various changes in conditions.

The boarding/deboarding point providing system, the data server, and the boarding/deboarding point provision method of the present disclosure have been described above based on the first embodiment. However, specific configurations are not limited to the first embodiment, and various modifications and additions to the design can be made without departing from the scope of the invention according to each of the claims.

In the first embodiment, an example was shown in which the boarding/deboarding point providing system, the data server, and the boarding/deboarding point provision method of the present disclosure are incorporated as a part of a probe information system that utilizes each vehicle as a sensor in order to collect a vast amount of probe data, and enables sharing of various information. However, the boarding/deboarding point providing system, the data server, and the boarding/deboarding point provision method of the present disclosure can also be applied to a system that has a data server dedicated to providing boarding/deboarding points that captures boarding/deboarding events, as long as the system uses probe information.

The invention claimed is:

1. A boarding/deboarding point providing system comprising: a probe vehicle group including a plurality of probe vehicles; a data server configured to communicate with the probe vehicles; and an information terminal configured to communicate with the data server,
the data server being configured to receive vehicle data transmitted from at least one probe vehicle among the probe vehicle group and to extract at least one boarding/deboarding point suitable for boarding or deboarding from the vehicle data, the vehicle data including a stop point where the at least one probe vehicle stopped, attribute data indicating at least one of a vehicle size, a vehicle classification, or a vehicle type of the at least one probe vehicle, and door open/close data regarding a position of at least one door of the at least one probe vehicle that was opened or closed while the at least one probe vehicle was stopped,
the data server being configured to store the at least one boarding/deboarding point and update a boarding/deboarding point information database to include the at least one boarding/deboarding point, and
the data server being configured to receive a request for boarding/deboarding point information from the information terminal and search the boarding/deboarding point information database based on vehicle size, vehicle classification, or vehicle type to find a boarding/deboarding point candidate that meets request conditions included in the request, and the data server being configured to transmit a search result that includes the boarding/deboarding point candidate and information indicating which door or doors of a dispatched vehicle are likely to be opened at the boarding/deboarding point candidate to the information terminal,
upon receiving the search result, the information terminal displaying information regarding the boarding/deboarding point candidate such that positions of the door or doors likely to be opened are indicated by a vehicle icon.

2. A data server that inputs vehicle data transmitted from a probe vehicle group, comprising:
a boarding/deboarding data acquisition unit that acquires boarding/deboarding data from at least one probe vehicle among the probe vehicle group, the boarding/deboarding data including a stop point where the at least one probe vehicle stopped, attribute data indicating at least one of a vehicle size, a vehicle classification, or a vehicle type of the at least one probe vehicle, and door open/close data regarding a position of at least one door of the at least one probe vehicle that was opened or closed while the at least one probe vehicle was stopped;
a boarding/deboarding point extraction unit that extracts a boarding/deboarding point as a boarding point or a deboarding point, based on the stop point of the boarding/deboarding data from the boarding/deboarding data acquisition unit;
a boarding/deboarding point information database storage unit that updates a boarding/deboarding point information database by storing the boarding/deboarding point extracted by the boarding/deboarding point extraction unit in the boarding/deboarding point information database; and
a boarding/deboarding point transmission unit that upon receiving a request for the boarding/deboarding point information, searches the boarding/deboarding point information database based on vehicle size, vehicle classification, or vehicle type to find a boarding/deboarding point candidate that meets request conditions included in the request, and transmits a search result that includes the boarding/deboarding point candidate and information indicating which door or doors of a dispatched vehicle are likely to be opened at the boarding/deboarding point candidate,
the search result being configured to cause an information terminal receiving the search result to display information regarding the boarding/deboarding point candidate such that positions of the door or doors likely to be opened are indicated by a vehicle icon.

3. The data server according to claim 2, wherein
the boarding/deboarding point candidate includes a plurality of boarding/deboarding points candidates that meet the request condition, and
the boarding/deboarding point transmission unit is configured to transmit the search result to display the plurality of boarding/deboarding point candidates in order according to vehicle type.

4. The data server according to claim 3, wherein
the boarding/deboarding point transmission unit is configured to refer to the attribute data and transmit the search result without including boarding/deboarding point candidates where only vehicles that are smaller than a vehicle scheduled to be dispatched have stopped.

5. The data server according to claim 2, wherein
the search result includes information regarding attributes of probe vehicles that have stopped at the boarding/deboarding point candidate.

6. The data server according to claim 2, wherein
the boarding/deboarding data include stop data indicating a stop time that the at least one probe vehicle was stopped, and
the boarding/deboarding point information database storage unit stores the stop data in the boarding/deboarding point information database when the stop time is longer than a prescribed period of time.

7. The data server according to claim 6, wherein
the boarding/deboarding data include date and time/location information data which include at least date and time where the at least one probe vehicle stopped and the boarding or deboarding point, and
the boarding/deboarding point information database storage unit stores the date and time/location information data in the boarding/deboarding point information database.

8. The data server according to claim 7, wherein
the boarding/deboarding data include weather data when the at least one probe vehicle was stopped,
the boarding/deboarding point information database storage unit stores the weather data in the boarding/deboarding point information database, and
the search result includes the weather data that is associated with the boarding/deboarding point.

9. The data server according to claim 6, wherein
the search result includes information that visually indicates a level of the stop time corresponding to the stop data for the boarding/deboarding point.

10. The data server according to claim 6, wherein
the door open/close data includes a time that the at least one door was opened or closed when the at least one probe vehicle was stopped.

11. The data server according to claim 2, wherein
the data server is configured to analyze each boarding/deboarding point stored in the boarding/deboarding point information database to identify trends regarding how much each boarding/deboarding point is used, which door or doors are likely to be opened at each boarding/deboarding point, and a maximum vehicle size suitable for each boarding/deboarding point.

12. The data server according to claim 2, wherein
the search result is configured such that the information terminal indicates the positions of the door or doors likely to be opened as images of doors protruding outward from a vehicle body on the vehicle icon.

13. A boarding/deboarding point provision method realized by communication between a probe vehicle group, a data server, and an information terminal, comprising:

using the data server to receive vehicle data transmitted from at least one probe vehicle among the probe vehicle group and extract a boarding/deboarding point suitable for boarding or deboarding from the vehicle data, the vehicle data including a stop point where the at least one probe vehicle stopped, attribute data indicating at least one of a vehicle size, a vehicle classification, or a vehicle type of the at least one probe vehicle, and door open/close data regarding a position of at least one door of the at least one probe vehicle that was opened or closed while the at least one probe vehicle was stopped;

using the data server to update a boarding/deboarding point information database by storing the boarding/deboarding point in the boarding/deboarding point information database;

using the data server to receive a request for boarding/deboarding point information transmitted from the information terminal to the data server and search the boarding/deboarding point information database for a boarding/deboarding point candidate that meets request conditions included in the request, the data server searching the boarding/deboarding point information database based on vehicle size, vehicle classification, or vehicle type; and using the data server to transmit a search result to the information terminal, the search result including the boarding/deboarding point candidate and information indicating which door or doors of a dispatched vehicle are likely to be opened at the boarding/deboarding point candidate; and using the information terminal to receive the search result and display information regarding the boarding/deboarding point candidate such that positions of the door or doors likely to be opened are indicated by a vehicle icon.

* * * * *